United States Patent Office 2,726,252
Patented Dec. 6, 1955

2,726,252
PROCESS FOR PREPARING LEUCO-TRIARYL-METHANE COMPOUNDS

Walter Jean Balon, Carneys Point, and Otto Stallmann, Bridgeton, N. J., assignors to E. I. du Pont de Nemours and Company, Wilmington, Del., a corporation of Delaware No Drawing. Application August 25, 1954,
Serial No. 452,218

5 Claims. (Cl. 260—391)

This invention relates to the preparation of leucotriamino-triarylmethane compounds. More particularly, this invention deals with the preparation of the leuco form of tris-p-aminophenyl-methanes wherein the three amino groups are all of a tertiary nature, their non-aryl valences being satisfied by substituents from the group consisting of lower alkyl (1 to 4 C-atoms), benzyl, β-hydroxyethyl and β-cyanoethyl. Accordingly, the compounds with whose preparation this invention deals may be represented by the general formula

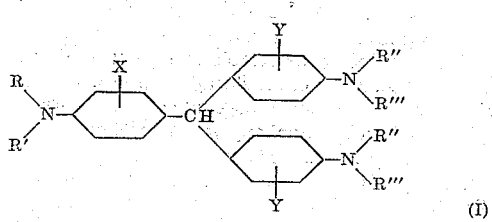

wherein R, R' and R'' represent lower alkyl, β-hydroxyethyl or β-cyanoethyl, R''' represents lower alkyl, benzyl, β-hydroxyethyl or β-cyanoethyl, while X and Y represent hydrogen, halogen, e. g. Cl, or methyl.

It is an object of this invention to provide an economical process for preparing compounds of the above type in a state of high purity, and particularly in a state of substantial freedom from the corresponding color (salt form, e. g. ethyl violet) and the corresponding carbinol. Additional objects and achievements of this invention will become apparent as the description proceeds.

In our copending application Ser. No. 408,044, wherein we are claiming a method for stabilizing leuco compounds of the above type against photooxidation in storage, three general methods of synthesizing the compounds have been indicated. These are:

(1) Reduction under alkaline conditions of the color salt or the carbinol form.

(2) Synthesis from lower intermediates, one of which is a hydrol (for instance, reacting 1 mole of bis-p-dimethylaminophenyl carbinol with 1 mole of a dialkyl aniline).

(3) Synthesis from lower intermediates, one of which is a benzaldehyde compound (for instance, reacting 1 mole of a p-dialkylamino-benzaldehyde with 2 moles of a dialkyl aniline).

Routes 1 and 2, however, are difficult and uneconomical where absolute freedom from color in the resulting leuco compound is sought. In the first place, the purification procedures themselves are costly. Secondly, the leuco compounds readily undergo photooxidation. This is true even of highly-purified leuco compounds of this type. Such oxidation occurs when the leuco compounds are exposed to daylight and air, especially at the elevated temperatures often used for recrystallization from solvents. Consequently, fresh amounts of the carbinols and dye salts are likely to be formed in the very process of purification.

The hydrol synthesis involves the use of relatively expensive initial materials, inasmuch as the carbinol itself has to be synthesized first from lower intermediates. Furthermore, the carbinol is unstable and must be prepared fresh for each charge.

Route 3 would seem the most desirable route from the viewpoint of cost of initial materials. However, this process has its drawbacks. The process usually requires an excessively long condensation time (24 to 48 hours at reflux) and the use of large excesses of the alkylated arylamine; otherwise, the yield is very low. When this process is applied to the production of leuco ethyl violet, the best conditions described in the literature for this type of synthesis yields less than 10% of theory, and the product is in a highly impure state.

Now we have found that leuco-triamino-triphenyl methanes of the formula above set forth can be prepared by the benzaldehyde route in good yield, in a state of high purity and in a reasonably short reaction period, if the reaction is carried out in the presence of urea or an equivalent compound as defined below and in the further presence of a strong, nonoxidizing acid.

Restated in further detail, our invention comprises a method of preparing leuco tri-p-aminophenyl methanes by reacting 1 mole of a p-aminobenzaldehyde whose amino hydrogens are replaced by substituents of the group consisting of lower alkyl, β-hydroxyethyl and β-cyanoethyl with substantially 2 moles of a tertiary arylamine at a temperature of about 70° to 120° C., in the optional presence of an alcoholic solvent, but in the necessary presence of a urea-type compound as defined below and of a strong, water-soluble acid.

The essential urea compound may be defined as a compound of the group consisting of urea, thiourea and such derivatives thereof as are obtained by replacement of hydrogen, in one of the nitrogens only, by inert substituents such as lower alkyl (1 to 4 C-atoms), aryl, nitro (—NO₂), amido (—CO—NH₂) and ureido

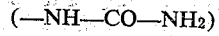
(—NH—CO—NH₂)

Specifically, the catalyst is illustrated by the following compounds: urea, thiourea, their monoalkyl and 1,1-dialkyl derivatives (of up to 4 C-atoms in each alkyl radical), nitrourea (H₂N—CO—NH—NO₂), biuret (H₂N—CO—NH—CO—NH₂) and biurea

(H₂H—CO—NH—NH—CO—NH₂)

The acids useable for our invention are typified by hydrochloric, sulfuric, phosphoric, formic, mono-, di- or tri-chloroacetic, benzene-sulfonic and p-toluene-sulfonic. In general, any non-oxidizing, strong mineral or organic acid appears suitable. For the purpose of this invention, an acid may be classified as strong if it is ionized at least to the same extent as formic. The acid may be aqueous or anhydrous. Acids having an oxidizing action, however, for instance, nitric acid, are to be avoided.

Although we regard the urea compound as a catalyst, its quantity to be employed is preferably 1 mole per mole of the aldehyde. It can, however, be varied from about 0.5 mole per mole of the aldehyde up to several moles is desired. In fact, the only upper limit is imposed by considerations of economy.

The quantity of acid to be employed is preferably not less than 2 acid-equivalents per mole of the p-aminobenzaldehyde compound. Larger quantities are not objectionable, except of course, that they will require larger quantities of alkali for neutralization in the recovery procedure.

Representative p-N-substituted benzaldehydes contemplated by our invention are dimethyl-, diethyl-, di-n-propyl-, di-iso-propyl-, the dibutyls, di(β-cyanoethyl), methyl-β-cyanoethyl, ethyl-β-cyanoethyl, di(β-hydroxyethyl), methyl-β-hydroxyethyl and ethyl-β-hydroxyethyl. The corresponding p-N-substituted o- and m-tolualdehydes and p-N-substituted o- and m-chlorobenzaldehydes are also operable.

The tertiary arylamine may be an aniline, o-chloroaniline, o-toluidine, or m-toluidine compound which is substituted on the N-atom by any combination of two radicals from the following group: methyl, ethyl, propyl, butyl, benzyl, β-cyanoethyl or β-hydroxyethyl.

Theory requires 2 moles of the tertiary arylamine for 1 mole of the benzaldehyde compound, thus:

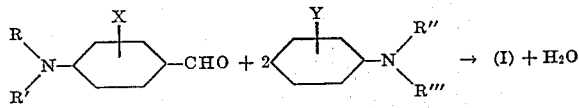

(I) here refers to the formula of the product set forth in the introduction hereinabove, while R, R', R'', R''', X and Y have the same significance as above.

However, an excess of the tertiary arylamine may be employed, if desired, to serve as a diluent for the reaction mass, by itself or in addition to any alcoholic diluent or to any excess of the acid employed for the same purpose. In such event, the excess arylamine may be recovered at the end of the reaction in any convenient manner, for instance by steam distillation or by mixing the reaction mass with a low boiling, inert solvent such as petroleum ether or isooctane to extract the arylamine from the leuco compound.

Where an alcoholic liquid diluent is used, the same may be any of the common alcoholic solvents, for instance methyl, ethyl or isopropyl alcohol, a lower monoalkyl ether of monoethylene glycol (the Cellulosolves) or of diethylene glycol (the Carbitols). Its quantity may vary within wide limits, say from 0.5 part by weight per part of the benzaldehyde compound and up, depending on the need. The criterion here is simply the physical need of producing a readily stirrable mass without wasteful use of excess quantities of the diluent.

The temperature of the reaction may be anywhere from about 70° to 120° C. The higher temperatures obviously will require a closed vessel or else a high-boiling solvent. They have the advantage of speeding up the reaction. Where, however, conc. sulfuric acid is employed as the acid, temperatures above 100° C. should be avoided, to prevent sulfonation. Also, because of the convenience of employing reflux, and because the most convenient or economical alcoholic solvents, namely, ethyl and isopropyl, reflux at about 78° and 85° C., respectively, the range of 78° to 85° C. naturally constitutes the preferred reaction temperature for our invention.

The product can be isolated by any conventional method disclosed in literature for the isolation of leuco triarylmethane compounds when made by the aldehyde synthesis. Where the leuco compound produced is low melting or oily, its isolation can be simplified greatly by taking advantage of this property. Thus, the completed reaction mass may be subjected directly, after neutralization of the strong acid, to steam distillation, which removes simultaneously the solvent, the unreacted reactants and any volatile impurities. The water layer is a solution of the urea compounds and of other water-soluble products including the alkali salts formed in the neutralization step. This layer can be decanted or filtered off from the molten or solidified leuco compound.

For the purposes set forth in our copending application Ser. No. 408,044, the crude product recovered above may at this stage be stabilized by adding to the molten product about 1 to 2% of an organic base, such as a quaternary ammonium hydroxide and it may be further treated, if desired, with triethanolamine or with 10 to 20% of its weight of one of the neutral, waxy materials commonly used in hectograph formulations, for instance paraffin type products sold under the trade names "petrolatum" or "micro wax." This produces a stable product melting at 70° to 85° C. from which the remaining water can be removed by heating at 90° to 105° C. (under stirring in vaccuo) and which then can be clarified by filtration at this temperature. Further details on this stabilization procedure may be found in our copending application above referred to.

If it is desired to market the product in crystalline form without waxy diluents, a small amount (e. g., up to 5 to 10%) of α-phenylbiguanide is mixed with the product. This enhances color stability on storage and in use.

In a preferred embodiment of our invention a simple purification step is added to the recovery process, to remove extraneous matter such as iron oxide normally picked up in conventional plant equipment. This step involves melting the crude product together with 10 to 20% by weight of non-acidic waxy materials, and adding to it 1 to 2 wt. % of a quaternary ammonium hydroxide and a small amount of diatomaceous earth. This effects complete precipitation of the iron compounds, so that these and any other solid impurities can be removed easily by filtration, settling and decanting, or by any other method for removing solids from liquids. The final product may be allowed to crystallize from a solvent or to solidify in casting pans, or it may be marketed in the form of pellets obtained by allowing the product to cool slowly under stirring in an aqueous system to which a sequestering agent may be added. This may be followed by or combined with a treatment with hydrogen peroxide to remove objectionable amine odor from the final product. All the above gives a colorless to light-colored product which contains no detectable iron impurities and is stable against discoloration on storage and use. It will be clear by now that our invention enables one to prepare a wide variety of tri(aminophenyl)methanes by a simple, relatively cheap route. The reagents are readily available, and the products are very light in color and stable against discoloration. Thus, they can be prepared in ordinary kettles with only moderate precautions against contamination, and can be stored and handled without discoloration or staining of the operator's skin and clothing.

The products are useful as colorless hectograph dyes, or for impact printing, as described more fully in our copending application above referred to.

Without limiting our invention, the following examples are given to illustrate our preferred mode of operation. Parts mentioned are by weight.

*Example 1*

To an agitated mixture of 106.5 parts of p-N-diethylamino benzaldehyde, 54 parts of urea, 197 parts of diethylaniline, and 400 parts of isopropanol, 139 parts of 93% sulfuric acid were added slowly while keeping the temperature at 25° to 28° C. The reaction mass was then stirred under reflux for 24 hours, then diluted with 200 parts of cold water and cooled to 25 to 30° C., whereupon 271 parts of a 30% sodium hydroxide solution were added slowly while maintaining the 25 to 30° C. temperature. The alkalinity was adjusted by the addition of a solution of 35 parts of sodium bisulfate in 175 parts of water, which made the reaction mass neutral to thymolphthalein, but still alkaline to phenolphthalein. The reddish-violet reaction mass was then decolorized by adding 20 parts of a 30% sodium hydroxide solution, followed by the addition of 6 parts of a 50% choline (technical betahydroxyethyl-trimethylammonium hydroxide) solution in methanol, and 9.5 parts of a 31.6% solution in ethanol of the reaction product of epichlorhydrin, ammonia, and sodium hydroxide (Example 4 of U. S. 1,977,251). The alcoholic solvent and the excess diethylaniline and other volatile by-products or impurities were then removed from the reaction mass by steam distillation. After the hot residual mass was settled, the oily upper layer was separated from the aqueous layer. It consisted of 274 parts of crude, wet leuco ethyl violet which solidified at room temperature to a crystalline solid.

For the purpose of further purification and stabilization, 100 parts of the above crude product were dissolved in 900 parts of boiling ethyl alcohol containing 5 parts of the choline solution, and the hot solution was clarified by filtration. After cooling slowly to 15° C., the precipitated, slightly cream colored crystals of leuco ethyl violet were filtered off and washed with 80 parts of ethyl alcohol to which 5 to 6 drops of the choline solution had been added. The product was dried at 50° C. to constant weight, giving 72.1 parts of dry product which melted sharply at 95 to 96° C. The combined alcoholic filtrate from the above purification was diluted with 250 parts of water and cooled to 15° C., giving another 4.6 parts (dry basis) of a product melting at 94 to 96° C. The overall yield of leuco ethyl violet was thus 76.3% of theory.

The crude leuco ethyl violet can also be purified by heating one part of it with 2 parts of alcohol to the boil, clarifying by filtration, and allowing the leuco to crystallize from the filtrate by cooling it under stirring to 30° C.

In the aforegoing procedure, the reflux apparatus was open to the atmosphere. When the same condensation procedure was repeated in an atmosphere of nitrogen, an 83% yield of the recrystallized leuco ethyl violet of excellent quality was obtained.

For the purpose of determining the contribution of the urea employed, the same procedure was repeated (in air) but without urea. The desired alkalinity was obtained in the neutralization step by the use of 260 parts of 30% sodium hydroxide solution. The diethylaniline recovered from the distillate amounted to 141 parts dried oil, showing that only 56 parts (less than 30%) has entered into reaction.

The weight of the crude, separated oil layer was only 134 parts and did not solidify on cooling to room temperature. This crude oil was dissolved at 60° C. in 400 parts of ethanol containing 4 parts of the choline solution. After this solution was kept for several hours at 10° C., the precipitate was isolated, giving 24 parts of an impure leuco ethyl violet, which melted at 81 to 90° C. This corresponds to a yield of only 8.7% of theory based on p-N-diethylamino benzaldehyde.

*Example 2*

A clear solution of p-N-diethylamino benzaldehyde was prepared by dissolving 127 parts of an aqueous plant filter cake containing 106 parts of p-diethylamino benzaldehyde, in 600 parts by volume of isopropanol at 30 to 35° C. A small amount of insoluble matter was filtered off, and the clarified solution was dehydrated by distilling off 100 parts by volume of a distillate which consisted of a nearly constant boiling mixture of isopropanol and water. The remaining solution was cooled to room temperature and 51 parts of urea and 358 parts of technical diethylaniline were added. The solution was stirred at room temperature while 156 parts of 96% sulfuric acid were added within 35 minutes. The reaction mixture was then heated and stirred at 78 to 80° C. for 18 hours. To the pale violet colored solution thus obtained, there was added at 65° C., 100 parts of 5% solution of a commercial sequestering agent (essentially, ethylene-diamine-tetracetic acid).

After cooling to 35 to 40° C., 310 parts by volume of a 30% sodium hydroxide solution was added slowly within one hour under stirring. The pH was adjusted to a slight alkalinity on Brilliant Yellow paper and 19 parts of a 32% alcoholic solution of a crude quaternary ammonium base obtained from epichlorohydrin, ammonia, and sodium hydroxide were added to the crude leuco ethyl violet solution. The mass was then subjected to steam distillation until practically all the volatile by-products, including the excess diethylaniline, had been removed. The agitation was stopped, allowing a sharp separation of leuco ethyl violet as a clear top layer of colorless oil.

To 100 parts of the molten product, 900 parts of hot water (about 95° C.) were then added, followed by 3 parts by volume of the quaternary ammonium base above indicated. The water-oil mixture was stirred at 90 to 95° C. while adding slowly 9 parts of cetyl alcohol and 9 parts of a commercial paraffin wax known as "Concord microcrystalline wax" which melts at 170 to 175° F. The mass was allowed to cool slowly, under constant agitation at moderate speed, to a final temperature of 30 to 35° C. At a temperature of 75 to 80° C. the oily material solidified slowly and separated into uniform small pale straw-colored pellets. These were filtered off and washed on the filter with 20 to 30 parts of cold water. The wet pellets thus obtained were dried at 50° C. in vacuum drier. The final product consisted of colorless, non-sticky pellets which melted at about 80° C. and showed excellent compatibility when incorporated in carbon paper formulations. Conversion to the color (by treatment with chloranil in dioxane solution) showed, by spectrophotometric analysis, that this pelleted product was equivalent in tinctorial strength to the present commercial standard of ethyl violet, C. I. 682.

*Example 3*

To an agitated mixture of 48.4 parts of p-N-diethylamino benzaldehyde, 89.6 parts of diethylaniline, 24.7 parts of urea, and 176 parts of anhydrous isopropyl alcohol, 61.2 parts of conc. sulfuric acid (96%) were added slowly within one-half hour while keeping the temperature below 35° C. The reaction mass was stirred for one-half hour, heated within one hour to 78 to 80° C., and kept stirring at this temperature for 24 hours. The mass was then diluted cautiously with 221 parts of isopropanol and 173 parts of water. After cooling to 25 to 30° C., the reaction mass was made slightly alkaline by adding 136 parts of a 28% aqueous ammonia solution. This was followed by adding 0.5 part of choline dissolved in 1 part of methanol. The mass was then cooled to 20° C. and stirred for one-half hour. The precipitated leuco ethyl violet was filtered off. The cake was washed with a cold solution prepared from 153 parts isopropanol, 153 parts of water and 1 part of choline which was used in the form of a 50% methanol solution.

When stabilized by the aid of choline and microcrystalline wax as in Example 2, pellets of the above product were obtained which exhibited the same high qualities as to purity, stability to photooxidation and good working properties for the preparation of carbon paper coatings as the product of Example 2.

*Example 4*

To a rapidly stirred mixture consisting of 71 parts of p-N-diethylamino benzaldehyde, 25.2 parts of urea and 125 parts of diethylaniline in 174 parts of isopropyl alcohol, were added slowly, while maintaining a temperature of 25 to 30° C., 43 parts of 93% sulfuric acid. The stirred mixture was heated over a period of 30 minutes to a temperature of 79 to 80° C. and held at this temperature for a period of 16 hours, after which it was diluted with 237 parts of isopropanol and 186 parts of water. To the reaction mass, after cooling to 30° C., were added slowly 110 parts of 30% sodium hydroxide solution and 1 part of 36% benzyl trimethyl ammonium hydroxide solution. This made the reaction mass just alkaline to Brilliant Yellow paper. Stirring was then continued for a period of 3.5 hours. The leuco ethyl violet which crystallized out of the reaction mass mixed with some sodium sulfate was filtered off, and the cake was slurried for ½ hour with 700 cc. parts of water containing 1 part of 36% benzyl trimethylammonium hydroxide solution, filtered from sodium sulfate solution, sucked well and dried. The dried product amounted to 143 parts of leuco ethyl violet corresponding to a yield of 78.2% of theory.

On recrystallizing the crude leuco ethyl violet once from 1100 parts of ethyl alcohol containing 1 part of 36% benzyl trimethylammonium hydroxide solution, the product was obtained as colorless cubic crystals which melted at 96 to 96.5° C.

Example 5

By repeating Example 4 except for using the equivalent quantities of dimethylaniline and p-dimethylamino benzaldehyde, leuco crystal violet was produced in colorless, stable form.

Likewise, by replacing the diethylaniline only of Example 4 by the equivalent quantity of dimethylaniline, an unsymmetrical leuco triamino triphenyl methane compound is obtained wherein two of the amino groups are dimethylamino while the third one is a diethylamino group. The yield after recrystallization is 81.7% of theory, and the product melts at 130 to 132° C.

Example 6

To a rapidly stirred mixture of 18 parts of p-N-diethylamino benzaldehyde, 6.4 parts of urea and 34 parts of N-ethyl-N-(beta-hydroxyethyl)-o-toluidine in 95 parts of isopropanol, 10.9 parts of 96% sulfuric acid were added slowly at a temperature of 25 to 30° C. The mixture was heated in one hour to a temperature of 79 to 80° C. and held at this temperature for a period of 16 hours, after which it was diluted with 46 parts of distilled water. After cooling the reaction mass to a temperature of 30° C., 28.5 parts of a 30% sodium hydroxide solution and 2 parts of 36% benzyltrimethylammonium hydroxide solution were added slowly.

The reaction mass, which was just alkaline to Brilliant Yellow paper, was then subjected to a steam distillation to remove the isopropanol and other volatile impurities. The cooled oily residue was extracted with 150 parts of ether containing 1 part of 36% benzyltrimethylammonium hydroxide solution. The ether extract was dried over anhydrous sodium carbonate and the ether was then evaporated off on a steam bath. The residual product was a pale yellow viscous oil, and is believed to be the leuco form of an unsymmetrical hexaalkyl-triamino-triphenyl methane compound of the formula:

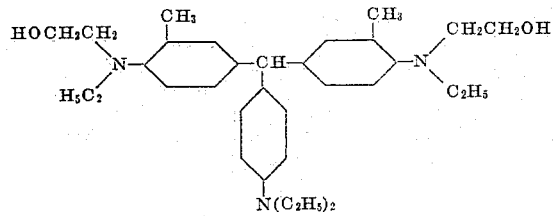

The leuco compound prepared above was stable against color formation on exposure to light and air and showed excellent compatibility in hectograph vehicles.

Unlike the leuco compounds from crystal violet or ethyl violet, the product of this example was found to be very soluble in most common solvents at room temperature, even in cold ethanol and in a mixture of 60% isopropanol and 40% water. A 1% solution of this stabilized leuco compound in ethanol showed a pH of 8.6 at 25° C. as compared with a pH of 7.8 for the solvent alone under similar conditions.

A test portion of this leuco compound when treated with chloranil in dioxane, was converted to the corresponding triphenyl-methane color of a bluish violet shade.

Example 7

To a mixture of 42 parts of N-β-cyanoethyl-N-methyl-aniline, 22 parts of p-diethylamino benzaldehyde, 7.5 parts of urea and 60 parts of isopropanol, 13.3 parts of 93% sulfuric acid were added slowly with agitation at 30 to 40° C. The mixture was heated within 1 hour to 78° C. and held at 78 to 80° C. for 3 hours. The reaction mixture was then diluted with 100 parts of isopropanol, and 90 parts of distilled water were added. This lowered the temperature to 56° C. To the violet solution thus obtained were added 34.6 parts of 30% sodium hydroxide, followed by one-half part of a 36% by weight solution of benzyltrimethylammonium hydroxide, and the mixture was stirred for 3 hours, during which time a viscous, pale yellow-colored substance separated out. This product did not solidify and was separated by decanting off the aqueous layer. It was then subjected to steam distillation to remove the volatile impurities. The oily-still residue formed on cooling a light colored, viscous product which weighed 67 parts. By oxidation into the carbinol and conversion into the dye salt, and by photometric studies of both the dye salt and the leuco compound itself, the latter was identified as a compound of the formula:

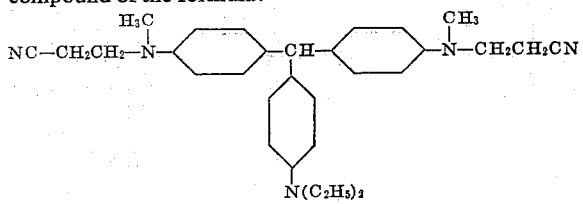

The product is soluble in hot isopropanol, tert. amyl alcohol and tert. butanol from which, on cooling, it separates in the form of a viscous oil. It is highly soluble in cold benzene, acetone, carbon tetrachloride, but insoluble in petroleum ether or isooctane. In diluted mineral acids, the leuco compound dissolves readily to give pale yellow, clear solutions.

Example 8

When two moles of the β-cyanoethyl-methyl-aniline were condensed by the procedure of Example 7 with one mole of p-dimethylamino benzaldehyde, the leuco compound of the corresponding structure was obtained in the form of a light-colored oil which did not solidify or discolor on storage. This leuco developed a similar shade color and was also in other respects similar to the leuco compound of Example 7.

Example 9

To 355 parts by weight of isopropanol while stirring at room temperature were added 89 parts by weight of p-N-diethylamino benzaldehyde, 57 parts of thiourea, and 164 parts of N,N-diethylaniline. The mixture was stirred for ½ hour at 25 to 30° C. and then 81.7 parts by weight of 96% sulfuric acid was added to it slowly at 20 to 25° C. The bright orange reaction mass thus formed was stirred for 30 minutes longer at room temperature, and then heated slowly to reflux (82 to 83° C.) and was held at reflux for a period of 16 hours. The reaction mass assumed at first a bright emerald green color, but gradually changed at the end of the reflux period to a pale dull violet color. The hot reaction mass was then diluted with 158 parts by weight of isopropanol and 175 parts of water, and after cooling to 25° C. made alkaline to Brilliant Yellow paper by the addition of 220 parts by weight of 30% of sodium hydroxide solution. Ten parts of a 36% benzyltrimethylammonium hydroxide solution were then added. After stirring for 1 hour longer at room temperature, the crude leuco ethyl violet product separated out as bright yellow crystalline plates. These were filtered off, washed with 900 parts of 50% alcohol and then with 1500 parts of water containing 5 parts of 36% benzyltrimethylammonium hydroxide, sucked well and dried in the vacuum oven at 50° C.

The yield of the crude product amounted to 89.1% of theory.

On recrystallizing the product from ethyl alcohol it was obtained in the form of colorless white plates, melting at 95 to 96° C.

Example 10

A mixture of 44.3 parts of p-diethylamino benzaldehyde, 18 parts of urea, 108 parts of N-ethyl-N-benzylaniline, and 40.8 parts of 96% sulphuric acid in 160 parts of isopropanol were stirred at 83 to 84° C. for 20 hours.

The mass was then diluted successively with 80 parts of isopropanol and 90 parts of water, cooled to 45° C. and neutralized with 110 parts of a 30% sodium hydroxide solution. After the addition of 2.5 parts of a 36% aqueous solution of benzyltrimethylammonium hydroxide, the mixture was stirred for several hours, allowing the temperature to drop to room temperature. The viscous reaction product was then separated from the aqueous layer and extracted with 500 parts of water (of 70° C.) containing 2 parts of the above quaternary ammonium hydroxide solution. The aqueous salt layer was then decanted off from the viscous leuco compound, and the latter was dissolved in 280 parts of benzene. The benzene solution was dried over caustic soda pellets, filtered, and the benzene was evaporated in a nitrogen atmosphere, giving a pale yellow product, which is believed to have the formula:

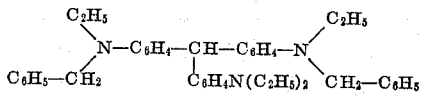

The yield was 140 parts, which corresponds to 96% of theory from p-diethylamino benzaldehyde. By analysis the product contained 6.91% of nitrogen, as compared with the theoretical value of 7.23%.

The product may be stabilized against discoloration by air and light in the manner described in our copending application Ser. No. 408,044. When converted into the dye-salt by treatment with chloranil according to copending application Otto Stallmann, Ser. No. 408,405, it produces a strong and bright violet-blue color.

*Example 11*

The procedure of Example 9 was repeated, except that in lieu of 57 parts of thiourea, 75 parts of phenylurea were used, and the mass was held at reflux for 20 hours instead of 16. The product, isolated and purified as in Example 9, was obtained in a yield of 68.8%. It exhibited similar properties to the product of Example 9.

In manners similar to the above examples, other dialkyl anilines may be condensed with p-diethylamino benzaldehyde, to give the corresponding triphenylmethane compounds. Of particular interest in this connection are N-methyl-N-ethyl aniline, dimethyl or diethyl ortho- or meta-toluidine, dimethyl or diethyl ortho-chloro-aniline, N-methyl-N-hydroxyethyl aniline, N-ethyl-N-benzyl aniline, N-methyl-N-hydroxyethyl ortho-toluidine, N-ethyl-N-cyanoethyl aniline, N-ethyl-N-cyanoethyl ortho-toluidine, di-beta-hydroxyethyl aniline, di-beta-cyanoethyl aniline, etc.

The p-diethylamino benzaldehyde itself in the examples may be replaced by p-dimethylamino benzaldehyde, p-N-methyl-N-ethyl-amino benzaldehyde, or p-dimethylamino or diethylamino-m-chlorobenzaldehyde.

In lieu of urea, thiourea and phenyl urea in the above examples, any of the other urea-type compounds indicated above may be used, for instance methyl urea, 1,1-dimethyl urea, methyl thiourea, ethyl urea, 1,1-diethyl urea, n-propyl urea, isopropyl urea, n-propyl thiourea, 1-methyl-1-n-propyl urea, 1,1-di-n-propyl urea, n-butyl urea, sec. butyl urea, 1-methyl-1-phenyl urea, phenyl thiourea, o-tolyl urea, o-chlorophenyl urea, nitrourea, biurea, or biuret. In lieu of sulfuric acid, any other non-oxidizing, mineral or organic acid of the group above indicated may be employed. Numerous other variations in detail will be readily apparent to those skilled in the art.

We claim as our invention:

1. A process for preparing a leuco tri-p-aminophenyl methane in a state essentially free of the corresponding dyestuff and carbinol compound which comprises condensing 1 mole of a p-amino-benzaldehyde of the formula

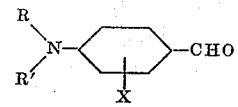

with essentially 2 moles of an arylamine of the formula

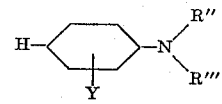

wherein R, R', and R" represent substituents of the group consisting of lower alkyl, β-hydroxyethyl and β-cyanoethyl, R''' represents a substituent of the group consisting of lower alkyl, benzyl, β-hydroxyethyl and β-cyanoethyl, while X and Y represent members of the group consisting of hydrogen, chlorine and methyl, said condensation being carried out at a temperature in the range of 70 to 120° C., in the presence of at least 2 equivalents of an acid per mole of the p-amino-benzaldehyde compound and in the further presence of at least 0.5 mole of an auxiliary agent selected from the group consisting of urea, thiourea, their lower monoalkyl derivatives, their N,N-lower dialkyl derivatives, their aryl and N-alkyl-N-aryl derivatives, biuret, nitrourea and biurea.

2. A process as in claim 1, the acid being a member of the group consisting of hydrochloric, sulfuric, phosphoric, formic, mono-, di- and trichloracetic, benzenesulfonic and p-toluene-sulfonic.

3. A process as in claim 1, the arylamine being present in excess of its reacting quantity, to assist in diluting the reaction mass.

4. A process as in claim 1, the reaction mass containing further an alcoholic solvent, to assist in diluting the reaction mass.

5. A process as in claim 1, the condensation product being recovered and then subjected to a purification step to remove iron compounds and alkali-metal salts.

No references cited.